(12) United States Patent
Muller et al.

(10) Patent No.: US 10,017,667 B2
(45) Date of Patent: Jul. 10, 2018

(54) ARTICLE IN CAST IRON COMPRISING A VITREOUS COATING AND METHOD OF MANUFACTURING SUCH AN ARTICLE

(71) Applicant: SEB S.A., Ecully (FR)

(72) Inventors: Pierre Jean Muller, Saint Felix (FR); Aurelien Dubanchet, Gresy sur Aix (FR); Jean-Luc Perillon, Saint Paul Trois Chateaux (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 14/077,614

(22) Filed: Nov. 12, 2013

(65) Prior Publication Data

US 2014/0134360 A1    May 15, 2014

(30) Foreign Application Priority Data

Nov. 13, 2012  (FR) ...................................... 12 60766

(51) Int. Cl.
```
C09D 183/04      (2006.01)
C23D 5/02        (2006.01)
C23C 18/12       (2006.01)
```

(52) U.S. Cl.
CPC .......... *C09D 183/04* (2013.01); *C23C 18/122* (2013.01); *C23C 18/127* (2013.01); *C23C 18/1225* (2013.01); *C23C 18/1241* (2013.01); *C23C 18/1254* (2013.01); *C23D 5/02* (2013.01); *Y10T 428/13* (2015.01); *Y10T 428/24355* (2015.01); *Y10T 428/24364* (2015.01)

(58) Field of Classification Search
CPC . C09D 183/04; C23C 18/127; C23C 18/1225; C23C 18/122; C23C 18/1241; C23C 18/1254; C23D 5/02; Y10T 428/13; Y10T 428/24355; Y10T 428/24364
USPC ...... 428/34.1, 141, 142; 427/330; 220/573.2
See application file for complete search history.

(56) References Cited

U.S. PATENT DOCUMENTS

| | | | |
|---|---|---|---|
| 7,879,449 B2 | 2/2011 | Jeon et al. | |
| 9,513,409 B2 | 12/2016 | Koike et al. | |
| 2006/0079600 A1* | 4/2006 | Gopalratnam | B22C 3/00 523/139 |
| 2007/0218297 A1* | 9/2007 | Jeon et al. | 428/447 |
| 2010/0181322 A1* | 7/2010 | Perillon et al. | 220/573.2 |
| 2010/0276432 A1* | 11/2010 | Huo et al. | 220/573.2 |
| 2011/0174826 A1 | 7/2011 | Le Bris et al. | |
| 2012/0018433 A1 | 1/2012 | Le Bris et al. | |
| 2012/0269976 A1 | 10/2012 | Huang et al. | |

FOREIGN PATENT DOCUMENTS

| | | | |
|---|---|---|---|
| CN | 101037351 A | 9/2007 | |
| JP | 6145946 A | 5/1994 | |
| JP | 407171059 A * | 7/1995 | ............. A47J 37/10 |
| JP | 2003-164379 | 6/2001 | |
| WO | 2012/077738 A1 | 6/2012 | |

OTHER PUBLICATIONS

Wacker Silicones, Wacker (R) AP 200 Product Information.*
Roper, et al., "The effect of peak count or surface roughness on coating performance," Journal of Protective Coatings and Linings, 22(6), p. 52-64, 2005.*
JP407171059, Yasuo Nishikimi, Jul. 1995, JP, (English Abstract).*
Dorrow, David et al., "Selecting the Right Abrasive", Journal of Protective Coatings, Jun. 1, 2006, Technology Publishing Company, Pittsburgh, PA, USA.

* cited by examiner

*Primary Examiner* — James C Yager
*Assistant Examiner* — Kevin C Ortman, Jr.
(74) *Attorney, Agent, or Firm* — The Webb Law Firm

(57) ABSTRACT

Provided is an article, particularly culinary, comprising a cast iron support having two opposite sides. The article comprises a vitreous coating in the form of at least a continuous layer of a sol-gel material comprising a matrix formed from at least a metal polyalkoxylate and at least a reactive or unreactive silicone oil, the layer of sol-gel material being deposited directly on one at least of the sides of said support, and the side provided with a vitreous coating has a surface roughness Ra ranging between 3 and 15 μm with a peak count per centimeter RPc ranging between 50 and 200. A method for manufacturing such an article is also provided.

14 Claims, No Drawings

ARTICLE IN CAST IRON COMPRISING A VITREOUS COATING AND METHOD OF MANUFACTURING SUCH AN ARTICLE

CROSS-REFERENCE TO RELATED APPLICATION

This application claims priority to French Patent Application No. 1260766 filed Nov. 13, 2012, the disclosure of which is hereby incorporated by reference in its entirety.

BACKGROUND OF THE INVENTION

Field of the Invention

The present invention generally relates to an article in cast iron comprising at least a side which has a specific roughness and is provided with a vitreous coating comprising a silicone oil. The present invention also relates to a method for manufacturing a coating synthesized by sol-gel process from such an article.

Description of Related Art

By cast iron, is meant within the meaning of the present invention, a cast iron of ferrous alloy type.

By vitreous coating, is meant within the meaning of the present invention, a liquid phase precursor based solution which is converted into a solid by a set of chemical reactions (hydrolysis and condensation) at low temperature. The, thus obtained coating is an organic-inorganic hybrid coating.

By organic-inorganic coating, is meant within the meaning of the present invention, a coating whereof the network is substantially inorganic, but which comprises organic groups, particularly due to the precursors used and the curing temperature of the coating and presence of silicone oil.

In the field of sol-gel coatings, it is particularly known of those obtained from silicon based metallic alkoxydes (silanes) or aluminum based ones (aluminates). These coatings are currently witnessing an important development in the field of culinary articles, and more particularly those whereof the support is in stainless steel or aluminum. They are also used by way of non-stick coatings covering the inner cooking surface.

As regards cast iron articles, the protective and/or decorative coatings known to this day are based on enamel or vegetable oil.

As regards more particularly culinary articles in enameled cast iron, these are enameled on their inner side as well as on their outer side with matte or shiny enamels. Nevertheless, they have many drawbacks. In fact, for enameling a cast iron support, it is necessary to use a grey iron, with a chemical composition such that the mass percentage of carbon (with respect to the total weight of the support) ranges between 3.2 and 3.7%, that of silicon ranging between 2.2 and 3%, that of manganese between 0.4 and 0.7%, that of phosphorous between 0.4 and 1%, and finally that of sulfur between 0.05 and 0.1% in weight. If this is not taken into consideration, aspect defects in the enamel risk appearing after curing, for example black spots or apitting phenomenon.

However, before the enameling, an advanced mechanical treatment (strong shot-peening) is recommended in order to increase the superficial surface of the support and remove the impurities left from the molding of the article in the foundry iron, such as to improve the adherence of the enamel on the cast iron.

Furthermore, the enameling of the cast iron most of the time requires (apart from matte enamel) a double curing: a first curing at 800° C.-840° C. to degas the substrate before applying the second layer of enamel; and a second curing for the second layer of enamel at 770-800° C. The enameling method of the cast iron is lengthy and highly energy-consuming, hence costly.

Finally, due to high curing temperatures and variations in thickness of the enamel layer or in the support, the risk of rejects (particularly for alignment type defects (metal defects reproduced by the coating) is high: it is often about 20% which is higher than an order of magnitude that is generally observed with an enamel for aluminum.

Furthermore, cast iron articles coated with black-colored vegetable oil are usually attractive when new, but are known to be incompatible with healthy and practical cooking. In addition, such articles are difficult to clean and exhibit, upon usage, low hardness and low resistance to oxidization. Finally aesthetic-wise, the use of a vegetable oil to cover a cast iron support limits the range of colors to black.

However, the applicant has now developed a method making it possible to deposit a vitreous coating on a cast iron support that has dishwasher resistance and support adherence properties, which allows to prevent all the aforementioned drawbacks. Furthermore, such a method makes it possible to deposit a vitreous coating whereof the color can be selected from a range of colors as varied as for an enamel coating (without being limited to black as is the case with vegetable oil).

It is known by the skilled person to use sol-gel coatings on cast iron articles. However, these coatings are not directly in contact with the cast iron support of the article in as far as they are deposited on an intermediate enameled layer. For example, American patent application US 2011/0111239 teaches of a non-stick coating for steel or cast iron surfaces comprising a first layer of vitrified enamel obtained from a composition of enamel frit heated at a temperature of the order of 700° C., whereof a portion is made rough and whereon is deposited a layer of sol-gel coating obtained from metal alkoxydes. However, US 2011/0111239 clearly teaches that the enamel/sol-gel bi-layer coating makes it possible to avoid the drawbacks of an entirely sol-gel coating for cast iron, which would hardly be non-stick, but also rough and able to become easily corroded in the dishwasher.

SUMMARY OF THE INVENTION

The applicant has now proven that it is possible to solve the dishwasher resistance issue of a vitreous coating obtained by sol-gel process deposited directly on the cast iron support by incorporating in the metal-polyalkoxylate based matrix of the vitreous coating a silicone oil that is reactive or not. Furthermore, the adherence issue on the cast iron support of the vitreous coating is resolved by a surface state adapted to the deposit of a vitreous coating obtained by sol-gel process.

DESCRIPTION OF THE INVENTION

More particularly, the present invention relates to an article comprising a cast iron support having two opposite sides, characterized in that it comprises a vitreous coating in the form of at least a continuous layer of a sol-gel material comprising a matrix formed from at least a metal polyalkoxylate and at least a reactive or unreactive silicone oil, said layer of sol-gel material being deposited directly on one at least of the sides of said support, and in that said side provided with a vitreous coating has a surface roughness Ra ranging between 3 and 15 µm with a peak count per centimeter RPc ranging between 50 and 200, and preferably between 90 and 120 according to EN 10049 standard ("measurement of roughness average Ra and peak count RPc on metallic flat products".

With the formation by sol-gel process (by coating then drying and curing) of a vitreous coating not requiring high curing (between 200° C. and 400° C.), it is possible to use, in the framework of the present invention, all types of cast iron and particularly a lamellar graphite cast iron (grey cast iron), spheroidal graphite cast iron (grey cast iron), blackheart cast iron (malleable white cast iron), whiteheart cast iron (malleable white cast iron), graphite free cast iron, or a vermicular cast iron.

However, it is essential, to allow for a good adhesion of the vitreous coating on the cast iron, that the latter has a surface roughness Ra ranging between 5 and 15 µm with a peak count RPc ranging between 20 and 200 peaks per cm, as illustrated on FIG. 1. These two conditions (Ra and peak count) are essential for obtaining a sufficient adherence of the vitreous coating on the cast iron. For equivalent roughness Ra, a too low peak count will lead to cracking and a detachment of the coating during washing cycles in the dishwasher.

Advantageously, it could be used, within the framework of the present invention, a silicone oil having a kinematic viscosity at 20° C. from 10 to 1000 $10^{-6}$ $m^2s^{-1}$. When the viscosity of the oil is too high (particularly higher than 1000 $10^{-6}$ $m^2s^{-1}$), its incorporation into the sol-gel matrix is unfavored, whereas when the viscosity of the oil is too low (particularly lower than 10 $10^{-6}$ $m^2s^{-1}$), the incorporation of the oil is certainly easier, but the effectiveness of the sol-gel coating with respect to dishwasher resistance is lesser.

It will preferably be used a reactive oil selected from among chlorinated oils, amino oils, vinylated oils, epoxidized oils, methacrylated oils, hydroxylated oils and anhydride or hydride-terminated oils.

Advantageously, the metal polyalkoxylate of the matrix of the sol-gel material of the vitreous coating according to the invention may comprise at least a polysiloxane.

Furthermore, the sol-gel material of the vitreous coating according to the invention may further comprise at least 5% in weight with respect to the total weight of the coating of at least a colloidal metal oxide dispersed in said matrix, this oxide can be selected from among the group comprising silica, alumina, titanium dioxide, cerium oxide, zinc oxide, vanadium oxide and zirconium oxide.

Advantageously, the vitreous coating of the article according to the invention may successively comprise based on the support:
  a first continuous pigmented and/or flaky layer of sol-gel material, this first layer being directly arranged on one of the sides of the support and being itself covered with
  a second continuous and transparent layer of sol-gel material, able to be flaky, The sol-gel materials of the first and second layers able to be identical or different and each comprising a matrix formed based on at least a metal polyalkoxylate and at least a reactive or unreactive silicone oil.

Advantageously, the pigment able to be contained in the first layer may be selected from among the thermally-stable pigments, metal salts, thermochrome semi-conductive pigments and their combinations.

Advantageously, the flakes that can be contained in the first and second layers can be selected from among the metal flakes (particularly in aluminum, in stainless steel, nickel, copper, iron, or alloy (Cu—Zn), mica flakes, mica flakes coated with titanium oxide and or an iron oxide, silica flakes coated with titanium dioxide, silica flakes coated with an iron oxide, natural mother-of-pearl in flakes.

According to a first particularly advantageous embodiment of this bi-layer configuration (first pigmented and/or flaky layer covered with a second transparent layer able to be flaky), the article according to the present invention may further comprise between the first and second layers of vitreous coating, a decoration with at least one pattern comprising at least one pigment.

Preferably, the decoration may be functional with a pattern comprising a thermochrome pigment composition with at least a thermochrome semi-conductive pigment.

By way of thermochrome pigments usable within the framework of the present invention, it may particularly be cited ferric oxide $Fe_2O_3$ (for example that commercialized by the Bayer company under brand name BAYFERROX), the perylene red associated with a black pigment, and semi-conductive metal oxides, which are preferably selected from among the following semi-conductors:
  $V_2O_5$, which has a yellow orange color at ambient temperature,
  $Bi_2O_3$, which has a near white color that is ever so slightly yellow at ambient temperature,
  $BiVO_4$, which is yellow at ambient temperature
  $WO_3$, $CeO_2$, $In_2O_3$, very similar to $Bi_2O_3$, and
  $Fe_2O_3$, which can be orange to brown at ambient temperature, and
  SC pyrochlore $Y_{1.84}$ $Ca_{0.16}Ti_{1.84}V_{0.16}H$ $O_{1.84}$ which is yellow orange at ambient temperature.

According to a second particularly advantageous embodiment of this bi-layer configuration (first pigmented and/or flaky layer, covered with a second transparent layer, able to be flaky), the second layer of vitreous coating and/or an intermediate layer arranged between the first and second layers may comprise magnetizable particles, with at least an area wherein said particles are substantially perpendicular to the support.

The magnetizable particles can come in different natures.

Within the framework of the present invention, the magnetizable particles can advantageously be particles comprising at least a ferromagnetic metal.

They can be of homogenous nature, that is to say constituted of the same material or of composite nature, that is to say that the magnetizable particles have a core-shell structure, wherein the ferromagnetic metal is in the core and/or in the shell of said particles.

By way of examples of composite magnetizable particles, it may particularly be cited flakes of mica coated with ferric oxide $Fe_2O_3$ or stainless steel fibers coated with a sol-gel material, as a protection against corrosion during the implementation steps of the coating, or even flakes in plastic material coated in ferric oxide $Fe_2O_3$, or flakes whereof the core is in ferromagnetic metal and the shell is in plastic material or a sol-gel material.

The vitreous coating according to the invention may advantageously further comprise non magnetizable particles for improving the reinforcement of the coating, these non magnetizable particles being included in the layer or layers of coating containing the magnetizable particles.

These non magnetizable particles can be of any shape (spherical, fiber or flakes or «irregular»), of micrometric, or even nanometric size.

By way of non magnetizable particles usable within the framework of the present invention, it may be particularly cited mica flakes, or mica or silica flakes coated in titanium dioxide.

The article according to the invention may advantageously be a culinary article having an inner side able to receive food and an outer side intended to be arranged towards the source of heat, said vitreous coating being applied on one at least of said inner and outer sides, or a heating article such as a barbecue accessory, or a chimney accessory, a water heater tank, a fuel burning stove, a chimney evacuation duct, a bathtub or even outdoor furniture (for example garden furniture).

The present invention further relates to a method for manufacturing a vitreous coating directly on a support in cast iron, the method comprising the following steps:

a) providing and/or realizing the support having two opposite sides;

b) treating the surface, particularly mechanically such as a shot-peening or sanding or a laser etching of the side or sides of the support intended to be coated, in order to obtain a surface roughness Ra ranging between 5 and 15 µm with a peak count ranging between 50 and 200 per centimeter;

c) preparing a sol-gel composition comprising at least a sol-gel precursor of metal alkoxyde type and at least a silicone oil that is reactive or not;

d) hydrolyzing said sol-gel precursor by introducing water and an acid or base catalyst, followed by a partial condensation reaction in order to obtain a sol-gel composition SG;

e) applying, directly on one at least of the sides of the support, of at least a layer of sol-gel composition SG; and f) curing at a temperature ranging between 200° C. and 400° C.

The method according to the invention is simplified (in particular the duration of the method is reduced) and energy efficient with respect to an enameling method. In fact, whether the vitreous coating is carried out by applying one single layer or two layers of sol-gel composition, the method according to the invention only comprises one single step of curing which is carried out at temperatures that are well lower (of the order of 200° to 400° C.) than those that are typically implemented in enameling methods (typically of the order of 800° C.).

Furthermore, the duration of the method according to the invention is also well lower than that of the enameling method.

Finally, the treatment of the cast iron surface is advantageously a mechanical treatment (typically of blasting or shot-peening type), less harsh (that is to say lead to a surface state that is less rough) than that required by an enameling method), which also makes it possible to improve the coating pace.

The mechanical surface treatment may be carried out within the framework of the present invention by any adapted medium having an angular morphology, such as sand (blasting), corundum or a metal shot (shot-peening with steel, particularly stainless steel). The size of the blasting or shot-peening medium determines the profile of the obtained roughness.

Blasting and shot-peening media with a size ranging between 35 and 140 mesh (105 to 500 µm) are preferred. If the particle size is too high, a too high Ra value and a too low peak count are obtained. The adherence is good but the aspect of the coating becomes too rough. If the particle size is too low, the Ra value is too low and the peak count is too high. Hence, adherence decreases.

Thanks to the low curing temperature of these coatings with respect to the enamels and the low complexity of the method with respect to an enameling method, a good number of aspect defects are prevented, and the reject rate is much lower.

The silicone oil and the support are such as defined previously.

It is preferably used, by way of sol-gel precursor a metal alkoxyde selected from among the group constituted by:

the precursors with the general formula $M_1(OR_1)_n$, the precursors with the general formula $M_2(OR_2)_{(n-1)}R_2'$, and the precursors with the general formula $M_3(OR_3)_{(n-2)}R_3'_2$, with:

$R_1, R_2, R_3$ or $R_3'$ designating an alkyl group in $C_1$-$C_4$, $R_2'$ designating an alkyl or phenyl group in $C_1$-$C_4$, n being an integer corresponding to the maximum valence of metals $M_1$, $M_2$ or $M_3$, $M_1$, $M_2$ or $M_3$ designating a metal selected from among Si, B, Zr, Ti, Al, V.

The metal alkoxyde can hence be advantageously selected, for example, from among the alkoxysilanes, aluminates, titanates, zirconates, vanadates, borates and their combinations.

It is preferably used an alkoxysilane by way of sol-gel precursor.

Advantageously, the method according to the invention may further advantageously comprise between the steps e) and f) a step of applying e') at least a layer of sol-gel composition on the opposite side to that coated previously with a sol-gel composition layer.

Advantageously, the method according to the invention may advantageously further comprise a drying at a temperature ranging between 40° C. and 90° C., which is achieved between the application of the layer or layers of sol-gel composition and the curing f). The drying is particularly recommended when the sol-gel coating includes a decoration.

Preferably, the method according to the invention may comprise the following steps in the case of a bi-layer application of sol-gel compositions:

e1) it is applied directly on one at least of the sides of the support, a first continuous pigmented and/or flaky layer of sol-gel composition SG, whereon e2) is applied a second continuous layer of sol-gel composition exempt from pigments and able to contain flakes.

The pigments and flakes usable within the method of the invention are such as defined previously.

Advantageously, the method according to the invention may further comprise between the steps e1) and e2) of applying the first and second layers of sol-gel composition:

a step of drying of the first layer, then a step of achieving a decoration comprising the application of at least a layer of decoration comprising at least a pigment;

the application of the second layer being immediately followed with a drying before the curing f).

If the pigment is a thermochrome semi-conductor (SC), the decoration will be said to be functional as it will be able to be used by way of temperature indicator. The SC thermochrome pigment is such as defined previously.

The invention is illustrated in further detail in the following examples. In these examples, unless otherwise specified, all percentages and parts are expressed in mass percentage.

EXAMPLES

Products
Supports:
in grey cast iron,
in white cast iron.
Silicone Oil:
Reactive methyl silicone oil commercialized by the Wacker company under brand name reactive OEL CT101M.
Sol-gel composition:
Sol-gel precursor: methyltriethoxysilane (MTES)
Colloidal filler: colloidal silica in the form of an aqueous solution at 30% silica, commercialized by the Clariant company under brand name KLEBOSOL,
Solvent: isopropanol.
Pigments
black mineral pigment commercialized by the Ferro company under brand name "FA 1260",
black mineral pigment commercialized by the Ferro company under brand name "FA 1220",
Tests
Dishwasher Resistance A dishwasher resistance test is carried out by using a dishwasher detergent commercialized by the Sun company under the name SUN All in 1, in the form of tablets, and the state of the ceramic coating deposited on the cast iron support is observed after a given number of washing cycles.

Shock adherence/resistance: the shock resistance test of enameled pieces (gun test), according to standard NF ISO 4532 is used.

Example 1 (According to the Invention) Preparing a Sol-gel Composition SG According to the Invention Comprising a Methyl Silicone Oil A first sol-gel composition SG1 is carried out according to the invention whereof the composition is given in table 1 hereinafter:

TABLE 1

| Composition SG1 | Quantity (g) |
| --- | --- |
| Aqueous solution at 30% of colloidal silica: KLEBOSOL | 26 |
| Water | 9 |
| Isopropanol | 5 |
| Black pigment FA 1220 | 22 |
| Silicone oil Wacker OEL CT101M | 0.6 |
| Methyltriethoxysilane (MTES) | 37 |
| Formic acid | 0.4 |
| TOTAL | 100 |

Example 2 (Comparative) Preparing a Reference Sol-gel Composition SG Exempt of Silicone Oil A second sol-gel composition SG2 (by way of comparison) is carried out whereof the composition is given in table 2 hereinafter:

TABLE 2

| Composition SG2 | Quantity (g) |
| --- | --- |
| Aqueous solution at 30% of colloidal silica: KLEBOSOL | 26 |
| Water | 9 |
| Isopropanol | 5 |
| Black pigment FA 1220 | 22.6 |
| Methyltriethoxysilane (MTES) | 37 |
| Formic acid | 0.4 |
| TOTAL | 100 |

Example 3 (According to the Invention) Realizing a Silicone Oil Based Vitreous Coating on a Support in Shot-peened Grey Cast Iron The sol-gel composition SG1 is applied by coating using the pneumatic gun on a shot-peened cast iron support with an angular stainless steel shot of a size of 90 mesh, such as to form a layer of sol-gel coating. The pre-shot-peened cast iron support has a surface roughness Ra of 7 μum with a peak count per centimeter RPc of 60 peaks/cm.

Then a thermal treatment of the article is carried out at 250° C. during 30 minutes, in order to densify the layer of sol-gel coating.

This article is then put into the dishwasher.

Following 100 cycles in the dishwasher, no deterioration is observed on the coating.

Moreover, the shock resistance test is good, that is to say, that no break in the coating leaving the metal to appear is observed for an applied impact force of 20 Newtons.

Example 4 (Comparative) Realizing a Vitreous Coating Exempt of Silicone Oil on a Support in Shot-peened Grey Cast Iron The sol-gel composition SG2 is applied by coating using the pneumatic gun on a cast iron support shot-peened with the same medium as in example 3, such as to form a layer of sol-gel coating. The pre-shot-peened cast iron support hence has a state of surface roughness whereof the characteristics are identical to those in example 3.

Then a thermal treatment of the article is carried out at 250° C. during 30 minutes, in order to densify the layer of sol-gel coating.

This article is then put into the dishwasher.

It can be observed, that despite a good adherence of the coating on the cast iron (the mechanical shock test at 20 Newtons is good, no bits of metal are observed as in example 3) and an absence of cracking of the film of the vitreous coating, corrosion points are formed after 30 cycles in the dishwasher. The hydrophobicity of the coating is hence insufficient to keep the dishwasher water full of alkaline compounds (detergents) away, thus infiltrating the cast iron support, creating these corrosion points.

Example 5 (Comparative) Realizing a Silicone Oil Based Vitreous Coating on a Non Shot-peened Grey Cast Iron Support The sol-gel composition SG1 is applied by coating using the pneumatic gun on a non shot-peened grey cast iron support such as to form a layer of sol-gel coating. The cast iron support is substantially smooth, the measured Ra being of 1 μm.

Then a thermal treatment of the article is carried out at 250° C. during 30 minutes, in order to densify the layer of sol-gel coating.

This article is then tested in the dishwasher.

Despite high hydrophobicity of the vitreous coating, a deterioration of the coating starting from 20 cycles in the dishwasher and a significant detachment of this coating is observed: Hence, such a coating no longer makes it possible to protect the cast iron.

Moreover, the shock resistance test at 20 Newtons is not acceptable, bits of metal appear after a shock.

The comparison of example 3 with the comparative examples 4 and 5 shows that the two claimed parameters (presence of silicone oil in the ceramic coating, and shot-peening adapted to the cast iron) are essential for obtaining good dishwasher resistance of the vitreous coating.

Example 6 (According to the Invention) Realizing a Silicone Oil Based Vitreous Coating on a Shot-peened White Cast Iron Support Exactly the same embodiment of example 3 is taken, but on a white cast iron support (instead of grey cast iron). The cast iron support pre-shot-peened with a stainless steel shot of a size of 60 mesh has a surface roughness Ra of 6 μm with a peak count per centimeter RPc of 75 peaks/cm.

The dishwasher resistance test results (100 cycles) and the shock resistance are good.

The invention claimed is:

1. An article comprising a cast iron support having two opposite sides, characterized in that it comprises a vitreous coating in the form of at least a continuous layer of a sol-gel material comprising a matrix formed from at least a metal polyalkoxylate and at least a reactive silicone oil, said layer of sol-gel material being deposited directly on a cast iron surface of at least one of the sides of said support, and in that said cast iron surface provided with a vitreous coating has a surface roughness Ra ranging between 3 and 15 μm with a peak count per centimeter RPc ranging between 90 and 200, wherein the reactive silicone oil is selected from chlorinated oils, amino oils, vinylated oils, methacrylated oils, and anhydride or hydride-terminated oils, and wherein the reactive silicone oil has a kinematic viscosity at 20° C. of $10 \cdot 10^{-6}$ $m^2s^{-1}$ to $1000 \cdot 10^{-6}$ $m^2s^{-1}$.

2. The article according to claim 1 wherein the peak count per centimeter of the side provided with a vitreous coating ranges between 90 and 120.

3. The article according to claim 1, wherein the support includes lamellar graphite cast iron, spheroidal graphite cast iron, blackheart cast iron, whiteheart cast iron, graphite free cast iron, or vermicular cast iron.

4. The article according to claim 1, wherein the metal polyalkoxylate comprises at least a polysiloxane.

5. The article according to claim 1, wherein the sol-gel material further comprises at least 5% by weight with respect to the total weight of the coating of at least a colloidal metal oxide dispersed in said matrix, said oxide being selected from among the group comprising silica, alumina, titanium dioxide, cerium oxide, zinc oxide, vanadium oxide and zirconium oxide.

6. The article according to claim 1, wherein the vitreous coating successively comprises based on one of the sides of the support:

a first continuous pigmented and/or flaky layer of said sol-gel material, said first layer being directly arranged on one of the sides of said support and being itself covered with a second continuous and transparent layer of said sol-gel material, is flaky, and wherein the sol-gel materials of the first and second layers being identical or different from each comprising a matrix formed on at least a metal polyalkoxylate at and at least a reactive or unreactive silicon oil.

7. The article according to claim 6, wherein the pigment of the first layer is selected from among the thermally-stable pigments, metal salts, thermochrome semi-conductive pigments and their combinations.

8. The article according to claim 6, wherein the first and second layers include flakes, and wherein the flakes of the first and second layers are selected from among metal flakes, mica flakes, mica flakes coated with titanium oxide and or an iron oxide, silica flakes coated with titanium dioxide, silica flakes coated with an iron oxide, natural mother-of-pearl in flakes.

9. The article according to claim 6, further comprising, between the first and second layer of vitreous coating, a decoration with at least one pattern comprising at least a pigment.

10. The article according to claim 9, wherein the decoration is functional and said pattern comprises a thermochrome pigment composition with at least a thermochrome semi-conductive pigment and optionally a thermally-stable pigment.

11. The article according to claim 6, wherein the second layer of the vitreous coating and/or an intermediate layer arranged between the first and second layers comprise magnetizable particles, with at least an area wherein said particles are substantially perpendicular to the support.

12. The article according to claim 11, wherein said magnetizable particles comprise at least a ferromagnetic metal.

13. The article according to claim 1, which is a culinary article having an inner side able to receive food and an outer side intended to be arranged towards the source of heat, said vitreous coating being applied on one at least of said inner and outer sides.

14. The article according to claim 1, which is a heating article selected from among barbecue accessories, chimney accessories, water heater tanks, fuel burning stoves, chimney evacuation ducts, bathtubs and outdoor furniture such as garden furniture.

* * * * *

UNITED STATES PATENT AND TRADEMARK OFFICE
CERTIFICATE OF CORRECTION

PATENT NO. : 10,017,667 B2
APPLICATION NO. : 14/077614
DATED : July 10, 2018
INVENTOR(S) : Pierre Jean Muller et al.

Page 1 of 1

It is certified that error appears in the above-identified patent and that said Letters Patent is hereby corrected as shown below:

In the Claims

Column 9, Line 46, Claim 2, after "claim 1" insert -- , --

Column 10, Line 10, Claim 6, after "the sides of" insert -- the cast iron surface of --

Column 10, Line 15, Claim 6, after layers, delete "being" and insert -- are --

Column 10, Line 15, Claim 6, after different, delete "from" and insert -- and --

Column 10, Lines 15 & 16, Claim 6, delete "comprising" and insert -- comprise --

Column 10, Line 16, Claim 6, after "formed" insert -- based --

Column 10, Line 17, Claim 6, after "alkoxylate" delete "at"

Column 10, Line 17, Claim 6, delete "or unreactive"

Column 10, Line 18, Claim 6, delete "silicon" and insert -- silicone --

Signed and Sealed this
Eighth Day of January, 2019

Andrei Iancu
*Director of the United States Patent and Trademark Office*